Jan. 16, 1973  L. H. GOODSON ET AL  3,711,251
DETECTION OF ORGANIC VAPOR CONTAMINANTS IN AIR
Filed April 14, 1971
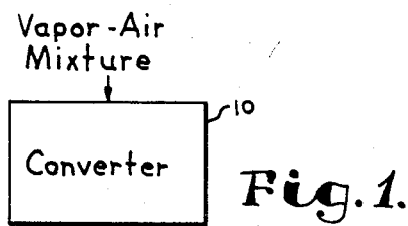
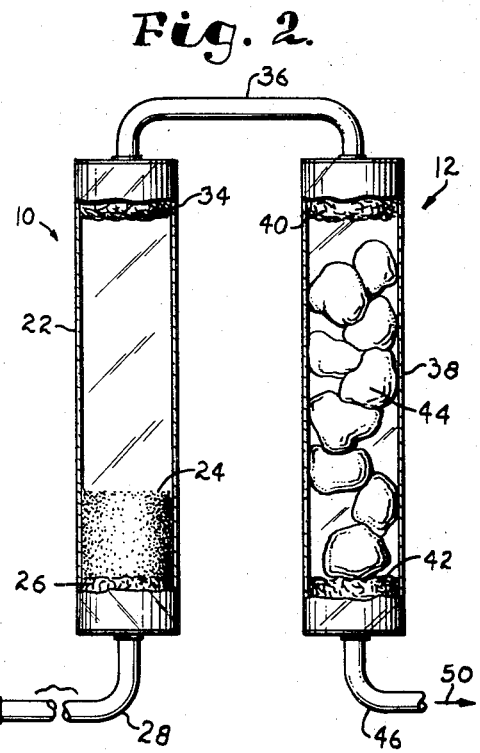
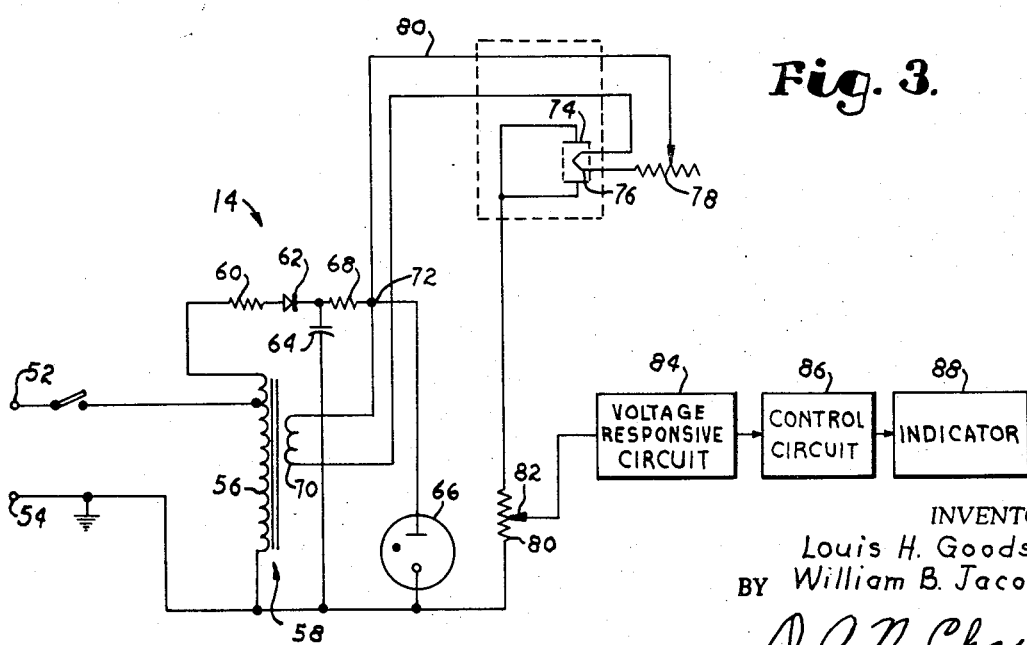
INVENTORS.
Louis H. Goodson and
BY William B. Jacobs
D.A.N. Chase
ATTORNEY

United States Patent Office 3,711,251
Patented Jan. 16, 1973

3,711,251
DETECTION OF ORGANIC VAPOR CONTAMINANTS IN AIR
Louis H. Goodson, Kansas City, and William B. Jacobs, Independence, Mo., assignors to The Insurance Institute for Highway Safety, Washington, D.C.
Filed Apr. 14, 1971, Ser. No. 133,817
Int. Cl. G01n *31/06, 33/00*
U.S. Cl. 23—232 R  18 Claims

ABSTRACT OF THE DISCLOSURE

The presence of an organic vapor contaminant in air is determined by combining the air suspected of containing such vapor with a reactive halogen compound to convert the organic contaminant to the corresponding, volatile, covalent halide; then removing vaporous, ionically bound reaction by-products from the air; and then detecting the remaining covalent halide through the use of a halogen leak detector or other suitable halogen sensors. The process may proceed on a continuous or intermittent basis, and has general application with respect to the detection of alcohol, aldehyde or ketone vapor contaminants. Apparatus is particularly adapted to sample air which is or recently has been in close proximity to a subject person to determine if a sufficient concentration of ethyl alcohol vapor is present to indicate that the subject may be impaired by alcohol.

---

This invention relates to a highly sensitive process and apparatus for determining whether air in a region of interest contains organic vapor contaminants having the property of being capable of reacting with halogen compounds to form volatile organic halides.

Heretofore, concentrations of alcohol and other organic vapors in atmospheric air have been determined intermittently through the use of standard air sampling collection techniques, following which the collected samples were then taken to a laboratory for chemical analysis. Also, various devices have been employed which are adapted especially for field detection of alcohol and other organic vapors in air. Some such devices are based on indicator materials whose color changes when exposed to alcohol, the materials being either suspended on substrates or contained in solutions. Although these devices for field detection may be portable, compact, effective, inexpensive or lightweight, none meets all of these criteria, and they often have several disadvantages when used in the field.

First, with respect to alcohol breath tests in the field, the lack of sensitivity of these devices is such that a direct sample of breath from the subject is often required. Second, the interpretation of the results of the test in the field requires judgment on the part of the test operator since no quantifiable signal is produced. Third, a relatively long time (on the order of a minute or more) is required to obtain the test results for a single parcel of air. Furthermore, sampling, analysis and readout cannot be carried out continuously.

It is, therefore, an important object of the present invention to provide a sensitive process of detecting organic vapor contaminants in air, wherein such process does not inherently possess the disadvantages discussed above and may be executed by relatively simple equipment.

Another important object of this invention is to provide a process as aforesaid which enables organic vapor contaminants to be detected rapidly in the field, and continuously if desired as well as on an intermittent basis.

Still another important object of this invention is to provide a relatively simple and reliable detecting or monitoring device for executing the aforesaid process, which is compact and lightweight to enable it to be easily carried by one man or in a motor vehicle, for example, without occupying space that would normally be used for passengers or other equipment.

Furthermore, it is an important object of the present invention to provide a process apparatus as aforesaid having the capability of generating a measurable signal for readout purposes in order to provide a quantitative as well as a qualitative indication of the presence of an organic vapor contaminant.

Yet another important object of this invention is to provide a process as aforesaid which is sufficiently sensitive to detect organic vapors (such as ethyl alcohol) in breath diluted by ambient air, such that air which is or has recently been in close proximity to a subject person may be tested for organic vapor content (which may indicate impairment of the subject in the case of ethyl alcohol) and an inference made thereby as to the organic vapor content of the breath of the subject in question. As a corollary to this object, it is an important aim of the invention to provide a detection process which may be rendered selective with respect to the sensing of alcohol vapor, to the exclusion of aldehyde and ketone vapors.

Additionally, it is an important object of the present invention to provide such a process and apparatus that is applicable to the monitoring of the level of organic pollutants in air as well as utilizable in the detection of possible impairment by alcohol of the driver of a motor vehicle.

In the drawing:
FIG. 1 is a flow diagram broadly illustrating the process and apparatus of the present invention;
FIG. 2 is a diagrammatic illustration showing the probe, converter and absorber-reactor; and
FIG. 3 is an electrical schematic and block diagram illustrating a type of halogen detector suitable for use in the present invention.

In the invention, an organic vapor contaminant present in air is converted by a halogenating agent to the corresponding, volatile, covalent halide in order to provide a compound that may be detected through the use of a suitable halogen detector. Manifestly, in order to be detected the organic vapor must be capable of reacting with a halogen compound to form a volatile halide; accordingly, volatile alcohols, aldehydes and ketones are particularly susceptible to detection by the process and apparatus of the present invention. In the conversion of such a vapor to a vaporous halide, reaction by-products are formed which may include volatile, electrovalent halides, and which always include an electrovalent halide when water vapor is present as is the case, of course, with atmospheric air. Therefore, the invention provides for the removal of electrovalent halide compounds subsequent to the exposure of the air to the halogenating agent. A full description of this process and exemplary apparatus is contained in the detailed specification to follow.

DETAILED DESCRIPTION OF THE FIGURES

With reference to FIG. 1, a vapor-air mixture is shown entering a converter 10 and subsequently flowing to an absorber-reactor 12. The converter 10 contains a reactive halogen compound such as phosphorus pentachloride ($PCl_5$) and, if the air introduced into the converter contains an organic vapor such as a volatile alcohol, aldehyde or ketone, such vapor is converted to its corresponding, covalent halide and the resultant mixture is introduced to the absorber-reactor 12. Due to the presence of water vapor in the air, such mixture will contain one or more electrovalent compounds such as hydrogen chloride (HCl) and may also contain electrovalent by-products of the reaction with the organic vapor, depending upon the particular vapor present. Accordingly, the absorber-reactor 12 serves to remove any electrovalent halogen compounds by combining the air with an alkaline substance capable of readily decomposing these ionically bound compounds and forming corresponding salts.

A halogen detector and attendant blower is illustrated at 14 in FIG. 1 and has an air intake 16, an exhaust 18 for discharge of air therefrom, and an electrical output 20 for providing a detection signal. Various types of halogen detectors are suitable depending upon the particular application; however, the ionization leak detector is particularly useful in the present invention due to its sensitivity and the electrical output provided by detection apparatus of this type. Such a leak detector is fully disclosed, for example, in U.S. Letters Pat. No. 3,065,411, issued Nov. 20, 1962, and has been selected for illustration herein in FIG. 3 to be subsequently discussed. It will be appreciated that the presence of a halogen compound in the air entering intake 16 is sensed by the detector 14 and that, since all but the covalent halogen compound have been removed from the air under test, the delivery of a signal at output 20 identifies the presence of the covalent halogen compound and indicates that the air entering the converter 10 contains an organic vapor. For the purpose of creating an airstream to draw the air into the converter 10, through the absorber-reactor 12 and into the intake 16, a positive displacement pump such as a diaphragm blower is particularly useful as the blower of the halogen detector and blower unit 14, although any other suitable air moving device may be used if desired. A blower of this type is quite compact and has a relatively small electrical power requirement enabling operation thereof from battery power.

An exemplary embodiment of the converter 10 and the absorber-reactor 12 is illustrated in FIG. 2. The converter 10 comprises an upright cylinder 22 closed at its upper and lower ends to define a reaction zone therewithin, the cylinder 22 being partially filled with a halogenating agent 24 ($PCl_5$ for example). A glass fiber prefilter 26 is fitted in the cylinder 22 at the lower end thereof and serves as a plug or retainer to prevent the $PCl_5$ from escaping. (The $PCl_5$ is of granular consistency and thus fluidizes easily.) A flexible tube 28 of appropriate length communicates with the lower end of the cylinder 22 and extends to a probe 30 having air inlet 32 in its terminal end.

Another glass fiber plug 34 is fitted into the upper end of the cylinder 22 and blocks the $PCl_5$ particles but permits relatively free passage of an airstream from the cylinder 22 through a piece of tubing 36 to the upper end of a similar cylinder 38 of the absorber-reactor 12. Glass fiber plugs 40 and 42 at the upper and lower ends respectively of the cylinder 38 retain a suitable neutralizing agent 44 (illustrated herein as chunks of soda lime) within the cylinder 38 which defines a second reaction zone. Since the chunks are relatively large (on the order of 2 to 4 mesh), airflow through the cylinder 38 is not substantially impeded. Another piece of tubing 46 communicates the lower end of the cylinder 38 with the sensing element of the halogen detector 14. The arrows 84 and 50 associated with the air inlet 32 and the outlet tube 46 illustrate that an airstream is created by the halogen detector blower, such airstream extending vertically upwardly through the converter cylinder 22 and vertically downwardly through the absorber-reactor cylinder 38. (It may be desired, particularly in instances where the selected agent 24 is a liquid, to have the air enter at the top of the cylinder 22 through a tube extending to the bottom thereof, for passage from the tube upwardly through the agent 24.)

The halogen detector 14 is illustrated in detail in FIG. 3. 110 volts AC is supplied to terminals 52 and 54 and is applied to a portion of the primary winding 56 of a transformer 58. The primary winding 56 serves as an autotransformer from which a stepped-up voltage is obtained (on the order of 200 volts), the output from winding 56 being fed to a current limiting resistor 60 and a half-wave rectifier 62. Filtering and regulation is provided by a capacitor 64 connected between the cathode of rectifier 62 and circuit ground, and a parallel-connected series combination of a voltage regulator tube 66 and resistor 68. A low voltage secondary winding 70 of transformer 58 has its upper end connected to a junction point 72 at the connection between the voltage regulator tube 66 and the resistor 68.

The halogen sensing element of the detector 14 comprises an ion collector electrode 74 which surrounds a filament or ion source 76, the latter being connected across the low voltage secondary winding 70. Note that a variable resistor 78 is interposed in the lead 80 connecting one side of the filament 76 to junction point 72. The collector 74 is connected to circuit ground through a resistor 80, thus the collector 74 is negative with respect to the filament or source 76. In this regard, it should be appreciated that the junction point 72 is at the positive potential of the DC output of the rectifier and filter network.

In accordance with the principle of operation of leak detectors of this type, the presence of a halogen vapor in the sensing element causes ionization therewithin to increase significantly, thereby producing an avalanche of positive ions flowing from filament 76 to collector 74. This materially increases the current flow through resistor 80, and hence the voltage at a variable tap 82 on resistor 80 becomes increasingly positive. This voltage is sensed by a voltage responsive circuit 84 and, if such voltage is above a certain threshold, a control circuit 86 is activated to effect operation of a suitable indicator 88. In the aforesaid Pat. No. 3,065,411, suitable vacuum tube circuitry is disclosed for executing the functions of the circuits 84 and 86, the indicator 88 disclosed therein being in the form of an incandescent lamp. The number of times that the lamp flashes when a halogen gas is detected is indicative of the quantity of such gas drawn into the sensing element by the blower. The threshold is adjustable by changing the position of the tap 82 so that the circuitry will be more or less sensitive to low halogen gas concentrations. In the present invention, however, it should be understood that other forms of indicators, either visible or audible for example, might be preferred depending upon the particular application. Furthermore, operation of the detector 14 from a 110 volt AC source is purely for purposes of illustration. In field applications, for example, operation from battery power would naturally be preferred, in which case the transformer, rectifier and filter arrangement would be replaced by a suitable DC converter.

THE PROCESS

In the converter 10 the air which has entered the inlet 32 of the probe 30 is combined with the halogenating agent since the airstream through the cylinder 22 is brought into intimate contact with the agent 24. A number of halogen compounds may be utilized in the converter 10, including $PCl_5$ as discussed above, phosphorus pentabromide ($PBr_5$), phosphorus trichloride ($PCl_3$), phosphorus tribromide ($PBr_3$), aluminum tribromide ($AlBr_3$), phosphorus oxychloride ($POCl_3$), and stannic chloride ($SnCl_4$). (It should be understood that $PCl_3$, $PBr_3$, $POCl_3$, and $SnCl_4$ would be in liquid form, thus a matrix or a solid phase support therefor would be required in the cylinder 22.) In order for an organic vapor contaminant in the air sample to be detectable by the process of the present invention, it must be characterized by the property of being capable of reacting with one or more halogen compounds to form a volatile organic halide. Accordingly, the halogen compound selected for the agent 24 must have the capability of converting the contaminant desired to be detected to the corresponding, volatile, organic halide. Vapors particularly susceptible to detection include the low molecular weight alcohols which has a significant vapor pressure and hence can be present as vapor in air within the range of normal environmental temperatures (i.e., air temperatures on the order of from −40° to +120° F.), and also include aldehydes and ketones having the capability of existing in vaporous form within such temperature range. The phrase "low molecular weight alcohols" is intended to denote alcohols having the general formula ROH where R represents an aliphatic radical having less than six carbon atoms.

In the absorber-reactor 12 the neutralizing agent 44 must be capable of readily decomposing ionically bound compounds and forming corresponding salts, thereby effecting the removal of any electrovalent halogen compound existing as a product of the reaction occurring in the converter 10. Since atmospheric air, unless subjected to prior dehumidification, contains water vapor as a natural constituent, an electrovalent product will be introduced into the absorber-reactor 12 by virtue of the reaction of water vapor with the halogenating agent 24 in the converter 10. Accordingly, it is important that electrovalent compounds be removed before the airstream reaches the halogen detector 14 since the latter is sensitive to this type of halogen compound as well as covalent compounds. Soda lime (principally NaOH and Ca(OH)$_2$) and potassium hydroxide (KOH) are suitable decomposing agents for the absorber-reactor 12, and other alkaline substances may be employed including metallic carbonates such as calcium carbonate (CaCO$_3$). In the case of KOH, pellets of this substance having some water content are preferable to anhydrous KOH pellets.

Although covalent halide compounds are not removed from the air as it passes through the absorber-reactor cylinder 38, it should be understood that certain compounds such as acetic acid, if present in the air entering the converter cylinder 22, react with PCl$_5$ to form acetyl chloride (CH$_3$COCl) which is subsequently removed from the air in the absorber-reactor. The acetyl chloride molecule has a covalent bond with an ionic character, and is decomposed in the presence of soda lime. Accordingly, the term "covalent" as used herein is not to be interpreted as including compounds such as acetyl chloride having electrovalent characteristics that render the compound readily decomposable by reaction with an alkaline substance.

Specific examples for the detection of ethyl alcohol, acetaldehyde and acetone will now be set forth. In all of the examples, the operating temperature of the converter 10 and the absorber-reactor 12, as well as the temperature of the incoming air under test, are in the range of normal environmental temperatures set forth hereinabove.

Example I

Detection of ethyl alcohol vapor in air employing PCl$_5$ in the converter 10 and soda lime in the absorber-reactor 12:

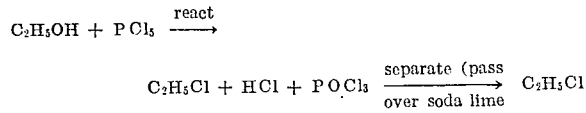

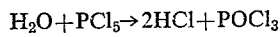

Additionally, due to the presence of water vapor in the air the following occurs:

$$H_2O + PCl_5 \rightarrow 2HCl + POCl_3$$

In Example I the ethyl alcohol-air mixture is first passed over the PCl$_5$ where the alcohol is immediately converted to ethyl chloride. The by-products of this reaction and the attendant reaction with the water vapor, including volatile POCl$_3$ and HCl, are then separated from the ethyl chloride as the airstream passes over the chunks of soda lime. Separation occurs by neutralization in the case of HCl and through decomposition by hydrolysis in the case of POCl$_3$. The covalent ethyl chloride, however, remains in the airstream and is conveyed to the halogen detector where it is sensed and an appropriate indication is produced.

Example II

Detection of ethyl alcohol vapor in air (containing water vapor) employing AlBr$_3$ in the converter 10 and KOH in the absorber-reactor 12:

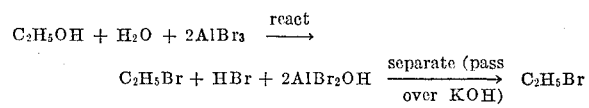

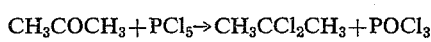

In Example II the ethyl alcohol is passed over anhydrous AlBr$_3$ where a portion of the alcohol vapor is converted to ethyl bromide. The aluminum bromo-hydroxide (AlBr$_2$OH) is relatively nonvolatile so that it is not carried further by the airstream. However, since water vapor present in the air also reacts with AlBr$_3$ to give HBr, this volatile halogen compound must be removed in the absorber-reactor.

Example III

Detection of acetaldehyde vapor in air employing PCl$_5$ in the converter 10:

$$CH_3CHO + PCl_5 \rightarrow CH_3CHCl_2 + POCl_3$$

The reaction of water vapor with PCl$_5$ is the same as in Example I.

In Example III the acetaldehyde vapor reacts with the PCl$_5$ and is thereby converted to ethylidine chloride (shown above) or to another volatile halogen compound such as ethylidine chlorohydrin, mono- or dichloro-acetaldehyde, or chloroethyl acetate. Since all of these possible products are volatile and have covalence, they are not removed by the absorber-reactor but are carried in the airstream to the halogen detector.

Example IV

Detection of acetone vapor in air employing PCl$_5$ in the converter 10:

$$CH_3COCH_3 + PCl_5 \rightarrow CH_3CCl_2CH_3 + POCl_3$$

The reaction of water vapor with PCl$_5$ is the same as in Example I.

In Example IV the acetone vapor reacts with the PCl$_5$ to give a volatile product containing a covalently bound halogen. This volatile halogen product, after the removal of unwanted POCl$_3$ in the absorber-reactor as in Example I, consists primarily of 2,2-dichloropropane (shown above) and is carried in the airstream to the halogen detector.

Another capability of the process of the present invention is the ability to detect alcohol vapor while remaining relatively insensitive to the presence of aldehyde or ketone vapors. Of the halogenating agents mentioned hereinabove, PCl$_5$, PBr$_5$, PCl$_3$, and PBr$_3$ are all reactive with aldehyde and ketone vapors as well as alcohol vapor in the temperature range previously indicated, and at higher temperatures. (PCl$_3$ and PBr$_3$ are relatively less reactive with aldehydes and ketones but are operable in the process at higher contaminant concentrations.) However, AlBr$_3$ and liquid POCl$_3$ and SnCl$_4$ are not reactive to any significant extent with aldehyde or ketone vapors but will convert low molecular weight alcohol vapors to the corresponding covalent halide. This selectivity is particularly desirable in eliminating interfering gases when it is desired to employ the process of the present invention to determine the concentration of ethyl alcohol for law enforcement or other purposes in air which is or has recently been in close proximity to a subject, as will be discussed. It is noteworthy, however, that in some applications sensitivity to aldehydes and ketones is desirable since, for example, a diabetic may emit acetone and other ketones in his breath. Furthermore, acetaldehyde is a breakdown product which may be present in the breath of one who is impaired by alcohol.

GENERAL OPERATION

The apparatus illustrated in FIGS. 2 and 3 is especially adapted for use by law enforcement officials to determine if air which is or recently has been in close proximity to a subject person has a sufficient ethyl alcohol concentration to indicate the possibility that the subject may be impaired by alcohol. For this application it is naturally preferred that the halogen detector and blower 14 be battery operated. The indicator 88 may comprise a visual or audible signalling device that is energized and remains energized if the vapor concentration is above a predetermined level. Such level would be the response threshold of the voltage responsive circuit 84 and would be set by the adjustable resistor 80. It may be appreciated that the converter cylinder 22 and the absorber-reactor cylinder 38 are relatively compact and that, therefore, the entire unit could be easily adapted to a number of law enforcement or safety scenarios.

One such scenario is one in which a patrolman wishes to ascertain whether the operator of a motor vehicle may be impaired by alcohol. To use the apparatus the patrolman merely requests that the driver open his window in the usual manner, whereupon the officer inserts the probe 30 through the open window to withdraw a sample of the air therewithin. Prior to actual use, the probe 30 may be fitted with a cap (not shown) over its inlet 32 which is removed just prior to exposure of the probe to the air within the automobile. The blower, of course, is in operation so that the air sample is immediately sucked into the tube 28 for passage to the detector 14.

It is expected that the alcohol vapor content of the air within an automobile may be considerably diluted due to the ventilation system or the presence of open windows. Accordingly, it is necessary that the process of the present invention have high sensitivity in order to be useful as an alcohol "sniffer" as discussed above. Furthermore, it should not be necessary for the patrolman to insert the probe into close proximity to the driver's head or ask him to voluntarily breathe toward the probe. Detection of the presence of alcohol vapor at a reasonable and non-invasive distance from the subject can be accomplished by the present invention since an ethyl alcohol vapor content on the order of 20 gammas per liter of air may be detected. Although greater sensitivity is theoretically possible there is a sensitivity limit from a practical standpoint due to the background ionization that will occur in the sensing element of the detector 14 because of the presence of interfering gases such as cigarette and cigar smoke and carbon dioxide. However, the alcohol vapor content in the breath from an individual with a blood alcohol content of 0.1% is approximately 500 gammas per liter of air, thus the high sensitivity of the present invention may be readily appreciated.

Having thus described the invention, what is claimed as new and desired to be secured by Letters Patent is:

1. A method of determining whether air in a region of interest contains a low molecular weight alcohol, aldehyde or ketone vapor contaminant characterized by the property of being capable of reacting with one or more halogen compounds to form a volatile organic halide, said method comprising the steps of:
   (a) in a reaction zone, combining air from said region suspected of containing said contaminant with a reactive halogen compound selected to have the capability of converting said contaminant to the corresponding, volatile organic halide whereby, if said contaminant is present in said air, reaction products are formed including said corresponding organic halide; and thereafter
   (b) determining whether said corresponding organic halide is present in the air from said reaction zone whereby, if said corresponding organic halide is detected, it is determined that air in said region contains said contaminant.

2. The method as claimed in claim 1, wherein said step (b) includes generating an electrical signal having a characteristic dependent upon the quantity of said corresponding organic halide detected.

3. The method as claimed in claim 4, wherein is further provided the steps of continuously conveying samples of the air in said region to said first reaction zone and, following said step (a), continuously conveying the air from said first reaction zone to said second reaction zone for said removal of any ionically bound halogen product therein.

4. A method of determining whether air in a region of interest contains a low molecular weight alcohol, aldehyde or ketone vapor characterized by the property of being capable of reacting with one or more halogen compounds to form a volatile covalent halide, said method comprising the steps of:
   (a) in a first reaction zone, combining air from said region suspected of containing said vapor with a reactive halogen compound selected to have the capability of converting said vapor to the corresponding, volatile, covalent halide whereby, if said vapor is present in said air, reaction products are formed including said covalent halide;
   (b) in a second reaction zone, removing any ionically bound halogen product from the air from said first zone; and thereafter
   (c) testing the air from said second zone for the presence of halogen compounds whereby, if a halogen compound is detected, said covalent halide is identified and it is thereby determined that air from said region contains said vapor.

5. The method as claimed in claim 4, wherein said reactive halogen compound in said step (a) is $PCl_3$.

6. The method as claimed in claim 4, wherein said reactive halogen compound in said step (a) is $PBr_3$.

7. The method as claimed in claim 4, wherein said step (b) comprises combining the air from said first zone with an alkaline substance capable of readily decomposing ionically bound halogen compounds and forming corresponding salts, thereby effecting said removal of any ionically bound halogen product.

8. The method as claimed in claim 4, wherein said reactive halogen compound in said step (a) is $PCl_5$.

9. The method as claimed in claim 4, wherein said reactive halogen compound in said step (a) is $PBr_5$.

10. A method of determining whether air in a region of interest contains ethyl alcohol vapor, said method comprising the steps of:
    (a) in a first reaction zone, combining air from said region suspected of containing said vapor with a reactive halogen compound capable of converting said vapor to an ethyl halide whereby, if said vapor is present in said air, reaction products are formed including said ethyl halide;
    (b) in a second reaction zone, removing any ionically bound halogen product from the air from said first zone; and thereafter
    (c) testing the air from said second zone for the presence of halogen compounds whereby, if a halogen compound is detected, said ethyl halide is identified and it is thereby determined that air from said region contains said vapor.

11. The method as claimed in claim 10, wherein said step (b) comprises combining the air from said first zone with an alkaline substance capable of readily decomposing ionically bound halogen compounds and forming corresponding salts, thereby effecting said removal of any ionically bound halogen product.

12. The method as claimed in claim 10, wherein said reactive halogen compound in said step (a) is selected to have the capability of being reactive with said vapor but not significantly reactive with aldehyde or ketone vapors present in the air from said region.

13. The method as claimed in claim 12, wherein said reactive halogen compound in said step (a) is $AlBr_3$.

14. The method as claimed in claim 12, wherein said reactive halogen compound in said step (a) is $POCl_3$.

15. The method as claimed in claim 12, wherein said reactive halogen compound in said step (a) is $SnCl_4$.

16. Apparatus for determining that air in a region of interest contains an organic contaminant, said apparatus comprising:
- a halogen detector having an air intake and means for sensing the presence of a vaporous halogen compound in air introduced into the detector through said intake;
- conduit means communicating with said intake and having an inlet remote therefrom adapted to be disposed in said region;
- means for creating an airstream in said conduit means from said inlet into said intake to convey an air sample from said region to said detector;
- means interposed in said conduit means in the path of said airstream for converting a halogen-reactive organic vapor in the air sample to a corresponding, volatile, organic halide for passage to said detector in the airstream; and
- indicator means responsive to sensing of said halide by said detector for indicating the presence of said organic vapor in the air in said region.

17. Apparatus as claimed in claim 16, wherein said halide is covalent, and wherein is provided means downstream from said converting means for removing any ionically bound halogen compound from the airstream, whereby said detector is sensitive to said covalent halide exclusively.

18. Apparatus as claimed in claim 16, wherein said detector is provided with means responsive to sensing of said halide for producing an electrical signal for controlling said indicator means, said signal having a characteristic dependent upon the quantity of said halide detected.

References Cited

UNITED STATES PATENTS 3,540,849    11/1970    Neti et al. _____ 23—230 R

MORRIS O. WOLK, Primary Examiner

R. M. REESE, Assistant Examiner

U.S. Cl. X.R.

23—232 E, 254 R, 254 E